United States Patent
Laforte et al.

(10) Patent No.: US 9,544,489 B2
(45) Date of Patent: Jan. 10, 2017

(54) EFFORTLESS NAVIGATION ACROSS CAMERAS AND COOPERATIVE CONTROL OF CAMERAS

(75) Inventors: Christian Laforte, Montreal (CA); Alexandre Cossette-Pacheco, Lachine (CA); Guillaume Laforte, Brossard (CA); Joshua Koopferstock, Montreal (CA)

(73) Assignee: FORTEM SOLUTIONS INC., Montreal (CA)

( * ) Notice: Subject to any disclaimer, the term of this patent is extended or adjusted under 35 U.S.C. 154(b) by 291 days.

(21) Appl. No.: 13/636,348

(22) PCT Filed: Mar. 25, 2011

(86) PCT No.: PCT/CA2011/000319
§ 371 (c)(1),
(2), (4) Date: Sep. 21, 2012

(87) PCT Pub. No.: WO2011/116476
PCT Pub. Date: Sep. 29, 2011

(65) Prior Publication Data
US 2013/0010111 A1   Jan. 10, 2013

Related U.S. Application Data (60) Provisional application No. 61/318,055, filed on Mar. 26, 2011.

(51) Int. Cl.
*H04N 7/18* (2006.01)
*H04N 5/232* (2006.01)
(Continued)

(52) U.S. Cl.
CPC ........ *H04N 5/232* (2013.01); *G08B 13/19645* (2013.01); *H04N 5/23216* (2013.01);
(Continued)

(58) Field of Classification Search
CPC ................ G08B 13/19645; G08B 13/19643; G08B 13/19608; H04N 5/232; H04N 7/185; H04N 5/247; H04N 7/181; H04N 5/23216; G06T 7/002
(Continued)

(56) References Cited

U.S. PATENT DOCUMENTS

7,522,186 B2 * 4/2009 Arpa et al. ............ 348/153
7,884,849 B2 * 2/2011 Yin et al. ............... 348/143
(Continued)

*Primary Examiner* — Gims Philippe
*Assistant Examiner* — Richard Carter
(74) *Attorney, Agent, or Firm* — Brouillette and Partners; Robert Brouillette (57) ABSTRACT

This application discloses a system and related methods (called Fast Track) to effortlessly navigate across multiple cameras, e.g. video surveillance cameras distributed in a facility. Fast Track simplifies the act of following a suspicious individual roaming in a facility, e.g. by eliminating the need for security operators to memorize camera placement and coverage, and to manually control pan-tilt-zoom (hereinafter "PTZ") cameras, and by simplifying the process to reduce the risk of operator error. Combinations of novel scoring and control methods generally provide an automatic identification of optimal cameras and pre-emptive re-direction of PTZ cameras. Extensions to these methods enable two new capabilities: Cooperative PTZ Control (e.g. coordinating PTZs to cover a 3D map viewport optimally) and Self-Healing Perimeters, to automatically reassign and redirect multiple PTZ cameras to fill gaps in a security perimeter.

16 Claims, 5 Drawing Sheets

High-level overview diagram of the navigation algorithm (51) Int. Cl.
    *G08B 13/196* (2006.01)
    *H04N 5/247* (2006.01)

(52) U.S. Cl.
    CPC ............ *H04N 5/247* (2013.01); *H04N 7/181* (2013.01); *H04N 7/185* (2013.01)

(58) Field of Classification Search
    USPC ...... 348/143, 153; 703/2; 340/686.1; 166/64
    See application file for complete search history.

(56) References Cited

U.S. PATENT DOCUMENTS

| | | | |
|---|---|---|---|
| 2006/0028548 A1* | 2/2006 | Salivar | G08B 13/19643 348/143 |
| 2008/0035324 A1* | 2/2008 | Ciglenec | E21B 47/04 166/64 |
| 2008/0055101 A1* | 3/2008 | Chung | G08B 13/19608 340/686.1 |
| 2008/0201116 A1* | 8/2008 | Ozdemir et al. | 703/2 |
| 2010/0208064 A1* | 8/2010 | Liu et al. | 348/143 |

* cited by examiner

Figure 1 – High-level overview diagram of the navigation algorithm

Figure 2 – Screenshot of Omnipresence 3D Software with navigation initiated

Figure 3 – Screenshot of Omnipresence 3D Software with navigation direction specified

```
Float minSearchDistance <- 15.0 # Meters
Float maxSearchDistance <- 50.0 # Meters
Float optimalDistance <- 10.0 # Meters.
Float samplePointCount <- 300 # Number of samples taken on line segments.
Float[] directionToleranceAngles <-  [every 1.5 degree between -15.0 and 15.0 degrees]

Float UpdateCamerasScore(Point clickedPoint, Vector clickedDirection, Float
clickedDirectionMagnitude)
{
  # Reset the accumulated camera scores.
  foreach (Camera c in sceneSurveillanceCameras)
  {
    if (c.IsSelected)
      c.Score <- -100000;
    else
      c.score <- 0
  }

# Vary the length of the search segments following the magnitude with which the
  # user has dragged in the clicked direction. The magnitude is in [0, 1] range.
  Float searchDistance <- minSearchDistance + clickedDirectionMagnitude *
    (maxSearchDistance - minSearchDistance)

# Accumulate scores for a fan of line segments following the clicked direction.
  foreach (Angle angle in directionToleranceAngles)
  {
    # Prepare one line segment that will be scored.
    Vector searchDirection <- clickedDirection.RotatedBy(angle, Axis::Z)
    Point searchEndPoint <- clickedPoint + searchDirection * searchDistance
    LineSegment searchSegment(clickedPoint, searchEndPoint)

foreach (Point samplePoint in searchSegment.GetPointsAlong(samplePointCount))
    {
      Float sampleDistance <- ||samplePoint - clickedPoint||

# Calculate the base score for this sample point. The maximum score is at
      # "optimalDistance" along the search segment. It decreases quadratically from
      # this distance. Range is [0, 1].
      Float baseScore <- 1 - (sampleDistance - optimalDistance)^2 / searchDistance^2
```

Figure 4a. The Fast Track camera scoring algorithm.

```
# Update each camera's score for this sample point.
foreach (Camera camera in sceneSurveillanceCameras)
{
    # The camera should score points if it can see this sample point. This
    # is done in Omnipresence by sampling a world position map texture generated
    # from the camera's point of view and comparing whether the sample point is
    # closer than the point on the map.

if (camera.IsPointVisible(samplePoint))
    {
        # Calculate the score multiplier ratio based on the distance of the sample
        # point to the camera. The maximum ratio is at "optimalDistance" from the
        # camera. It decrease linearly from this distance. Range is [-infinity, 1].
        Float cameraDistanceToSamplePoint <- ||camera.Position -  samplePoint||
        Float cameraSampleProximityScore <- 1 - Abs(cameraDistanceToSamplePoint -
            optimalDistance) / searchDistance camera.Score <- camera.Score + baseScore * cameraSampleProximityScore;
    }
}
```

Figure 4b. The Fast Track camera scoring algorithm.

EFFORTLESS NAVIGATION ACROSS CAMERAS AND COOPERATIVE CONTROL OF CAMERAS

CROSS-REFERENCE TO RELATED APPLICATIONS

The present patent application claims the benefits of priority of commonly assigned U.S. Provisional Patent Application No. 61/318,055, entitled "Effortless Navigation across Cameras and Cooperative Control of Cameras" and filed at the United States Patent and Trademark Office on Mar. 26, 2011.

FIELD OF THE INVENTION

The present invention generally relates to physical security systems and more specifically to systems for controlling cameras in video surveillance systems.

BACKGROUND OF THE INVENTION

Effortless navigation across cameras: In video surveillance, following a suspect roaming across multiple cameras in a large indoor or outdoor environment can be very challenging.

Using a traditional surveillance solution, an operator must first memorize the layout of the facility (i.e. map) and the location of the cameras. Surveillance cameras often have a pan-tilt-zoom ("PTZ") capability, meaning that they can rotate arbitrarily and zoom to see far-away details. Remembering what each camera can see takes a significant effort.

Tracking a suspect across a hallway with multiple branches offers very little margin for error and takes most of the concentration of a security operator, making it hard to think about high-level questions such as "does this suspect present a real threat and if so, what is this suspect trying to achieve?" and preparing a response (e.g. calling a security guard on site).

PTZ cameras have a limited field of view (e.g. 30 degrees when fully zoomed out) and therefore generally point in the wrong direction. When switching to a PTZ camera in a traditional surveillance solution, an operator must then manually move it (e.g. by selecting a preset from a list, or using a joystick), wasting many precious seconds during which the suspect may turn a corner and get out of sight.

Using traditional solutions, recovering a suspect that gets out of sight is highly problematic. An operator must mentally identify the cameras that the suspect is likely to go through eventually. He must then cycle through these cameras rapidly, hoping to find him when he passes by. It may take minutes for the suspect to reappear. PTZ cameras can be redirected, but because a human can at best look at a handful of cameras at once, in practice operators have a very hard time recovering suspects that got out of sight.

All of these problems are compounded by factors like stress and fatigue. The margin for error when following an armed and dangerous suspect is extremely thin, and security guards often go through hours of monotony making them prone to mistakes and inattention. The ideal solution must require no memorization or concentration, and allow fast and easy recovery in case of mistakes.

An ideal solution goes beyond simply tracking a suspect, and enables the operator to navigate freely in the environment, e.g. to move around and be generally aware of the current situation in a specific area. Another common need is to enable virtual visitors to navigate inside and participate in a virtual reproduction of a building, tradeshow, shopping center or city.

The ideal solution must also work equally well in real-time situation and during investigations of events and video sequences that have been archived. The solution must work reliably across a wide range of environments including facilities with multiple floors (transitions between floors, inside/outside), navigation across city-blocks where cameras may be on roofs, walls, moving vehicles (Unmanned Aerial Vehicle, car, elevator, bus, train), and so on.

Most video surveillance solutions offer a 2D map to users. Using a map can help to identify possible cameras of interest, but constantly switching attention to/from videos/map distracts operators and increases the chance to miss suspicious activity. When switching cameras, humans also tend to oversimplify the problem and rely on simple cues like geographic proximity, i.e. cameras that appear close to the last seen position of the suspect as seen in the map in 2D. Such simple criteria are not optimal to identify relevant cameras. For instance, high-end PTZ cameras can zoom 30× and therefore, a far-away camera that can point in the right direction often offers superior view of the action.

Countless prior art focuses on the general problem of navigating in a 2D or 3D environment. Relatively few constrain the problem to images and videos taken by nearby locations. Techniques published by Microsoft Photosynth and Noah Snavely (e.g. [Finding paths through the world's photo—Siggraph 2008]) assume a high density of nearby cameras, and gradual small changes in camera position and orientation. They do not work reliably when the camera coverage is very sparse and orientations differ significantly, the common scenario in video surveillance applications. They also do not explicitly handle occluders like walls.

Some commercial solutions advertise capabilities to simplify tracking of suspects. They use overly simplistic solutions such as presenting up-down-left-right buttons to the operator, which once clicked, switch to other cameras in a hard-coded fashion. In practice, these techniques are of limited use. For instance, they do not work when multiple hallway branches are visible, they do not take full advantage of PTZ camera capabilities, they do not work with panoramic cameras, they require extensive setup time, and they do not handle cameras that translate (e.g. in an elevator).

There are automated techniques to track suspects across one more multiple cameras, but they all suffer from many drawbacks. For instance, high-end PTZ cameras often include a so-called auto-tracking feature. This feature typically relies on a simple background subtraction [https://computation.llnl.gov/casc/sapphire/background/background.html] to identify movement in the scene, and moves the cameras to keep the movement in frame. This solution, while occasionally reliable in simple scenarios like a single person moving without occlusion in front of a camera, does not handle transition across multiple cameras, crowds, objects moving naturally (e.g. water, trees affected by the wind), etc.

More complex video analytics methods try to separate the suspicious person or object from the rest of the movement, but all known techniques are unreliable in complex real-life scenario, e.g. large number of people walking in multiple directions in a possibly dynamic environment (snow, rain, smoke). For the time being at least, only humans can make intelligent decisions to follow a specific individual in a crowded scene.

Tracking can also be performed by identifying individuals, e.g. through biometrics like facial recognition, RFID tags, and GPS sensors. These techniques all suffer from limitations. Facial recognition techniques require a good view of the face and no known method is perfect, so false negatives and false positives are very frequent even in ideal scenarios. RFID and GPS require extra hardware and often the cooperation of the individual being tracked. None of these solutions provide much control to the operator when he desires to navigate without actually tracking a specific individual, to simply be aware of nearby activity.

There is thus a need for a more effective method for navigating across multiple images or videos related geographically, especially for the case of following a suspect using video surveillance cameras.

Cooperative Control of Cameras: A related challenge is the effective and intuitive monitoring of a large outdoor area. Monitoring a large outdoor area (e.g. dozens or hundreds of cameras surrounding a facility) is challenging because each camera only gives limited a point of view. Operators often suffer from a "tunnel effect" because they only see a small amount of information at a time.

Most 2D video surveillance solutions used in practice do not provide sufficient spatial context, i.e. it is not clear how each camera is related to others. For instance, if an individual in a crowd is pointing at another person visible in another camera, it is very hard for a human to immediately grasp who the person is pointing at, because both cameras are presented separately and traditional solutions do not present an intuitive mapping between the two.

The Omnipresence 3D software application includes a 3D video fusion capability to display many real-time or archived videos realistically on top of a 3D map. (This is sometimes also referred to as 3D video draping or 3D video projection.) For each pixel in a 3D map viewport, a calculation is made to identify which fixed, panoramic or PTZ cameras has the best view of that pixel, and the 3D fusion is performed according to the precise, continuously-updated position, direction and field-of-view ("FOV") of each camera. This provides spatial context, since it is immediately clear how two cameras visible in the 3D viewport are interrelated spatially, and it reduces the "tunnel effect" problem since cameras that point close to each other are automatically "stitched" in 3D to provide a panoramic view.

One limitation to this 3D fusion approach is that PTZ cameras may not be pointing in the optimal locations. A simple solution consists in providing simple user control, e.g. having the user click on a location in the 3D map, and having the system identify and redirect one or a few PTZ cameras that can see that location.

The approach is limited because each PTZ camera is handled independently. An ideal system would focus each PTZ camera on a different area of the 3D map to provide an optimal coverage, referred hereon as a Cooperative Camera Control for an Optimal 3D Map Coverage (C3DM). Each PTZ camera would complement the other, to provide to the operator the optimal representation of the action occurring in the 3D map, as if he was surveying that 3D space from an aerial viewpoint. This would occur automatically and in real-time as the operator moves around the 3D map in the 3D map viewport.

Self-Healing Perimeter: Large critical-security facilities often have a long perimeter defined by fences, natural barriers (e.g. cliffs) and water front. One popular security design approach consists in dividing the perimeter into perimeter segments, and assigning one camera on or near the perimeter to monitor that perimeter segment constantly.

Occasionally, one or some of these cameras are broken, obscured (e.g. by cargo ship, rain, sun glare), disconnected or otherwise unusable. When this happens, there is a gap in the perimeter that can be exploited by burglars, illegal immigrants or drug traffickers.

Critical facilities often use PTZ cameras, or fixed cameras on top of pan-tilt heads, as a solution to this problem. A human can choose a PTZ camera and redirect it to cover the gap. The problem is that, at best, it may take minutes for a human to identify the problem and address it. In practice, in facilities that have lots of cameras and more lax procedures, it is more likely that it will take days or even weeks for the problem to be identified and addressed.

The ideal solution would monitor all cameras and within seconds, identify when a camera is tampered with or unusable. The system would then automatically identify one or more PTZ cameras that cover the gap(s) optimally.

There is thus a need for more effective methods for camera control, especially for the cases of cooperatively controlling multiple PTZ cameras.

SUMMARY OF THE INVENTION

The principles of the present invention are generally embodied in a scoring method 120 that evaluates input parameters including a point 115, an optional direction 116 and a list of cameras 103 (see FIG. 1).

During the virtual pursuit of a suspect, the point 115 is typically a point located near where the suspect was last seen. The direction 116 corresponds to the direction desired by the operator and/or the approximate direction the suspect went toward. These positions and directions are specified in a space common to the cameras, often relative to a map 104.

The scoring method 120 extrapolates the likely areas the suspect may have gone toward, and identifies which cameras 103 have an optimal or partial view of that extrapolated area, then the higher-level application may use this scoring information to perform state changes 130, e.g.:

a. Switch to the optimal new camera in the main camera viewport 210.
b. Changing PTZ parameters on one or multiple cameras to point them toward the last seen position 115, optionally favouring the area in the general direction 116. Or pre-emptively position PTZ cameras toward the possible branches in the newly selected camera.
c. Display other cameras that scored high, e.g. are nearby and/or connected by passages and hallways, in one or more secondary camera viewport 205.

Typically, though not necessarily, all steps are performed in real-time or near real-time.

The proposed method works reliably across a wide range of problems. In addition, the method makes minimal use of memory and computation capabilities, so a standard low-end computer system can navigate through a plurality of cameras interactively.

Other and further aspects and advantages of the present invention will be obvious upon an understanding of the illustrative embodiments about to be described or will be indicated in the appended claims, and various advantages not referred to herein will occur to one skilled in the art upon employment of the invention in practice. The features of the present invention which are believed to be novel are set forth with particularity in the appended claims.

BRIEF DESCRIPTION OF THE DRAWINGS

The above and other objects, features and advantages of the invention will become more readily apparent from the following description, reference being made to the accompanying drawings in which:

FIG. 1 is a high-level overview diagram of the navigation method.

FIG. 2 is a screenshot of the Omnipresence 3D software, one exemplary embodiment of the present invention.

FIG. 3 is another screenshot of the Omnipresence 3D software where a direction has been specified by the user.

FIGS. 4A and 4B are an example of software pseudo-code for the scoring method, in accordance with the principles of the present invention.

DETAILED DESCRIPTION OF THE PREFERRED EMBODIMENT

Novel methods and systems for navigating effortlessly across cameras will be described hereinafter. Although the invention is described in terms of specific illustrative embodiments, it is to be understood that the embodiments described herein are by way of example only and that the scope of the invention is not intended to be limited thereby.

Figure 1:
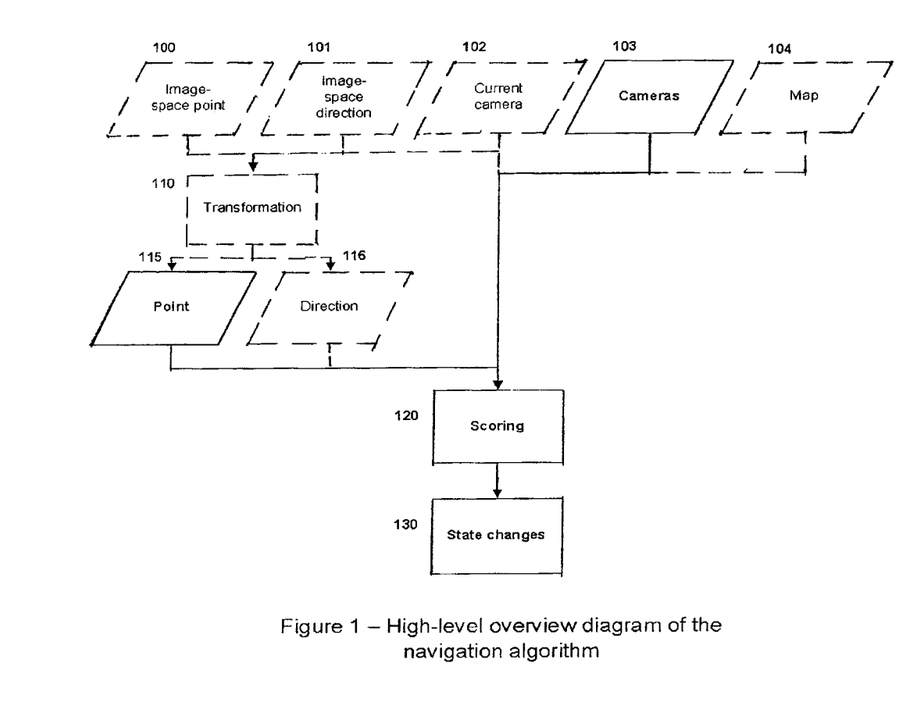
Figure 2:
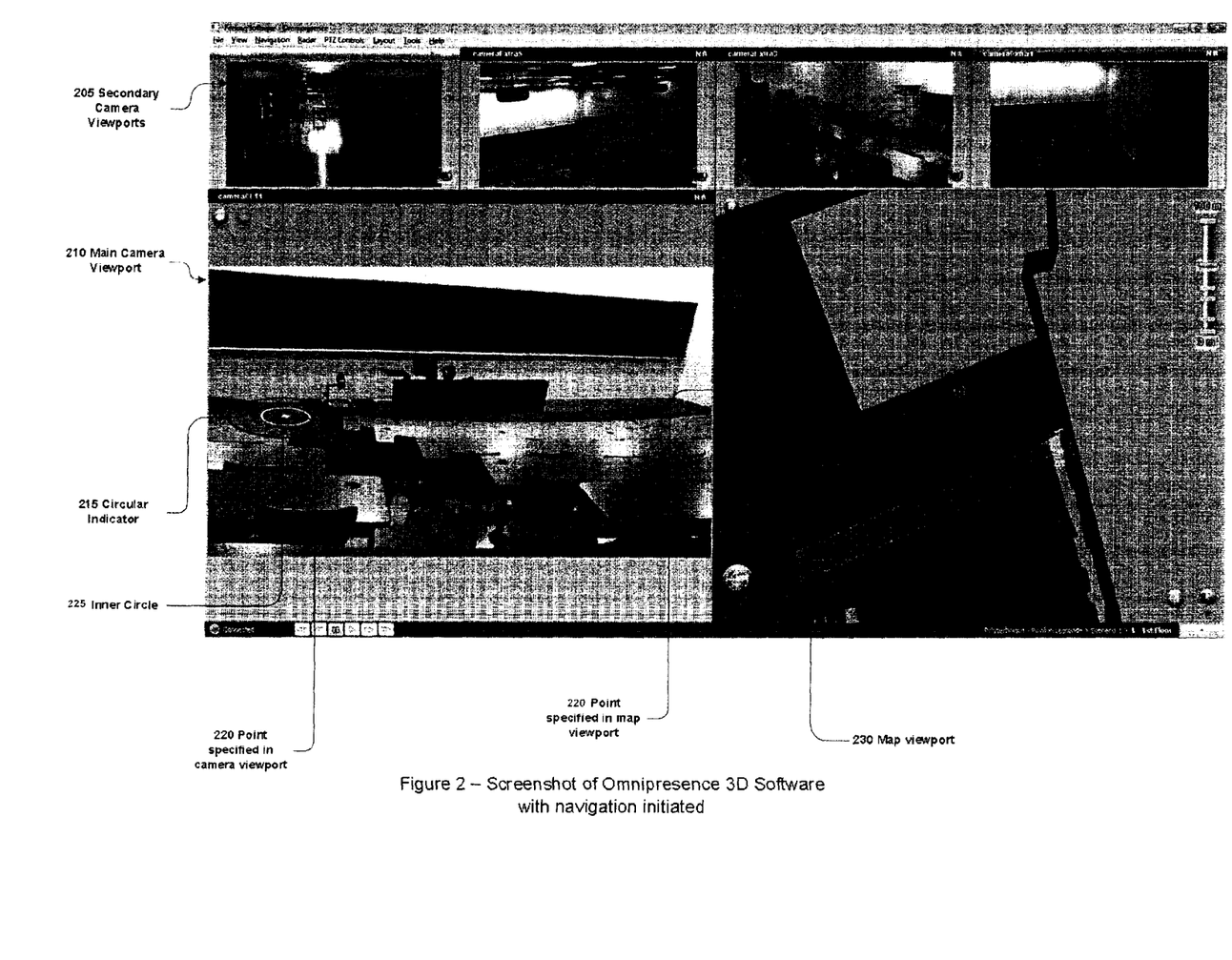
Figure 3:
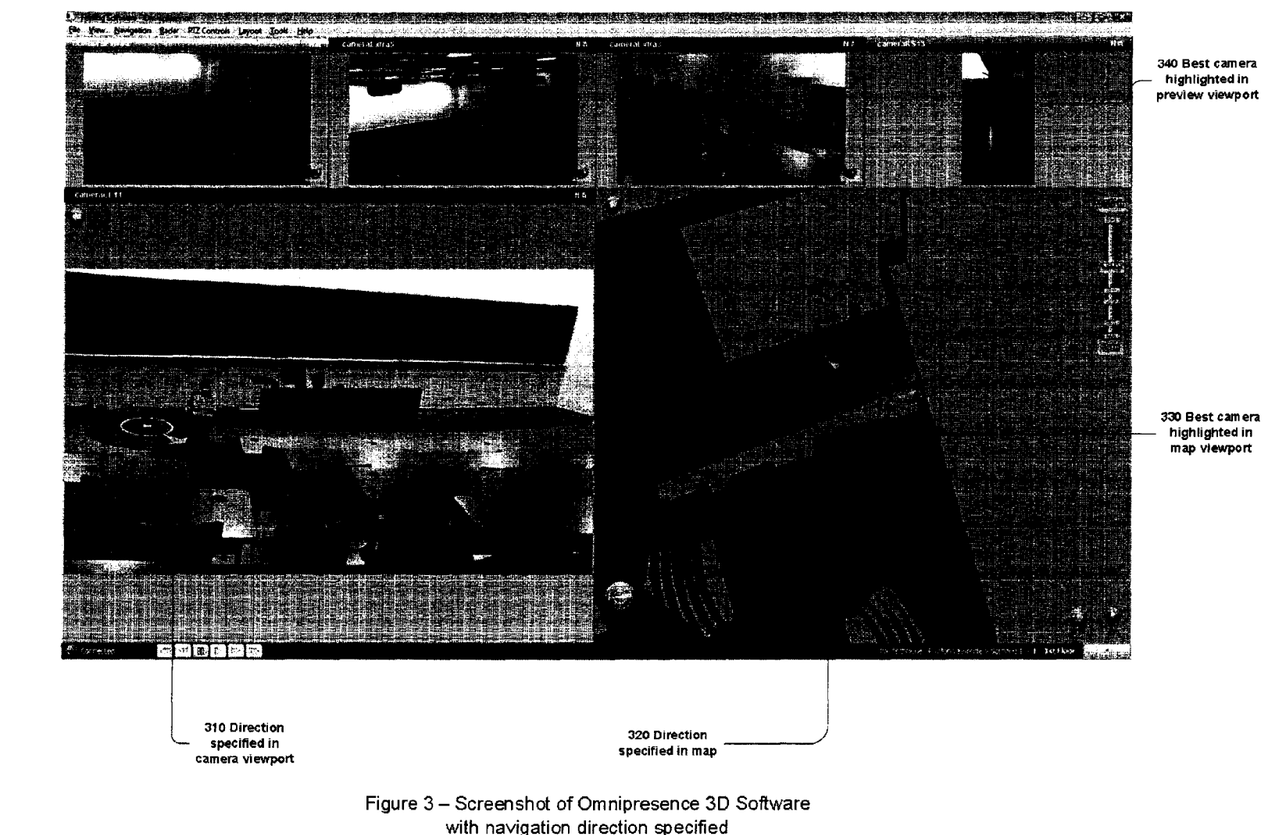

Referring to FIGS. 1-3, a point 115 and an optional direction 116 must first be provided in the same space in which cameras 300 are specified. Many approaches are possible. At its simplest, a user can mouse-down on a 2D map and drag to specify a direction relative to that map. A user can click on a 3D map, a 3D picking method can identify (e.g. through raytracing or rasterization) the closest intersecting polygon in the 3D model and its local normal, and the screen-space direction can be specified and projected on the polygon to obtain a direction expressed in the same space as the 3D map.

Optionally, the point and optional direction may be specified in a different space, e.g. to improve usability or take advantage of visual information provided by one or multiple cameras.

For instance, in the exemplary Omnipresence 3D application, shown in FIGS. 2 and 3, the point 115 and optional direction 116 are specified through the exemplary Fast Track user interface, consisting in four main steps.

a. The user moves the mouse cursor over a camera viewport (e.g. main camera viewport 210 or secondary camera viewports 205). The user presses the left mouse button to input a center point 220 specified in Camera Viewport 210.

b. In response, a circular indicator 215 is displayed along the ground plane, centered on the point 220 specified in camera viewport 210. The indicator 215 is displayed with the proper position, orientation and perspective transformation so it appears to be part of the displayed video image.

Accurate placement of the indicator 215 is achieved using the viewport's camera calibration information in addition to the 3D model data to calculate the 3D geometry of the video image displayed in the viewport. This requires both accurate 3D geometry and camera calibration. Another option would be to extrapolate the local normal from a depth-map (e.g. generated through stereo) or point cloud (e.g. generated by laser scanner).

The main steps to properly place and display the circular indicator 215 are:
   i. Create a ray from the camera's 3D position through the clicked position in screen space.
   ii. Do an intersection test with the ray and the 3D model geometry. The intersection point is the 3D world position corresponding to the clicked point. (This is commonly known as a 3D picking operation.)
   iii. Calculate the camera's view and projection transformations. By applying the reverse transformation, the image-space point 100 is transformed 110 into a point 115 expressed in the map's coordinate system (e.g. world-space).
   iv. Use the view and projection transforms to draw a quad centered at the clicked point's 3D position. The quad is textured with an image of the circular indicator 215. On the 3D map viewport 230, a corresponding circle and point specified in the map viewport 230 is displayed as well.

c. Maintaining the left mouse button pressed, the user drags the mouse in the direction where the subject is headed. Once the mouse cursor is outside the inner circle 225 of the circular indicator 215, an arrow indicator between the clicked position and the current position is displayed (Direction specified in camera viewport 310). The equivalent direction specified in the map 320 is displayed as well. Using the same approach to display the circular indicator 215, the arrow is displayed with the proper position, orientation and perspective transformation so it appears to be part of the displayed video. This also transforms the image-space direction 101 into a direction 116 expressed in the 3D model's coordinate system. The last step is changed to:
   iv. Draw the target as a quad extending from the clicked point's 3D position to the current mouse cursor 3D world position. If the current cursor's 3D world position is further away than a fixed limit of 1.5 times the radius of the circular indicator 215, then the quad is limited to that size. If the cursor is less than 0.5 times the radius of the circular indicator 215, it is inside the inner circle, and is not displayed. These numbers (1.5, 0.5) are arbitrary and may be adjusted automatically depending on other parameters, for instance scaled according to the viewport or screen resolution.

d. In Omnipresence 3D, the scoring takes place and state changes are previewed and applied continuously, in real-time, as the mouse cursor is moved until either the left mouse button is released or the "Escape" key is pressed. Either event will initiate completion of the Fast Track navigation.
   i. When the "Escape" key is pressed, if the mouse button is released while the arrow indicator is not visible, or if no optimal camera was identified, then Fast Track navigation will end with cancellation. The circular and arrow indicators will be hidden and the current camera will not be changed.
   ii. When the mouse button is released while the arrow indicator is displayed and an optimal camera has been identified, then Fast Track navigation ends with success. The circular and arrow indicators are hidden and the optimal camera becomes the main camera, i.e. the camera displayed in the main camera viewport 210. The 3D map is also centered on the new main camera and aligned to look in the main camera's direction.

Thus, the direction arrow is oriented to track the current mouse cursor position and becomes longer as the user moves the cursor farther away from the circular indicator. The direction of the arrow is the direction for which the best camera will be searched while the length of the arrow may be used as an indicator of the relative distance along which the search for an optimal camera will be performed. This length is referred to as the "direction magnitude" in the scoring method. For example, in an indoor environment, the direction magnitude scales the search distance from between 15 meters, when the arrow is just outside the circular indicator to 50 meters, when the arrow at its longest length. These numbers (15, 50) were found to work well in practice for indoor environments because it favors candidate cameras that will minimize the gap during which the suspect will not be visible by any camera, and because the average speed of the suspect (3-5 m/s) makes it unlikely that he/she would cover more than 15 meters in the 5 seconds following the Fast Track command. These parameters may be adjusted according to the type of suspect being followed (e.g. pedestrian, car, boat, aircraft), or according to a user-controllable zoom level in the 3D map.

Instead of relying on user inputs, the point 115 and optional direction 116 can also be estimated using background subtraction and optical flow techniques, similar to those used in PTZ camera auto-tracking. For instance, the point 115 is estimated by the centroid or center of mass of a set of contiguous pixels (blob) identified by background subtraction. The direction is estimated using discrete differentiation of the point 115 from previous frames, or by using optical flow techniques such as tracking features within the blob. This extends the traditional PTZ Auto-tracking capability to automatically switch from camera to camera with no need for user intervention.

Multiple scoring methods can be implemented and selected according to parameters such as indoor/outdoor, type of facility, etc. An exemplary embodiment corresponding to version 1 of the exemplary Omnipresence 3D Fast Track scoring method is shown in FIG. 4 in pseudo-code format and described in details next.

The scoring method is applied to candidate cameras, i.e. nearby video surveillance cameras in the 3D scene. Each candidate camera is evaluated to receive a per-camera score. The list of candidate camera may be generated dynamically. For less than 500 cameras, a brute-force approach (i.e. treat all cameras are candidates) is typically fast enough. For very large scenes (e.g. entire cities consisting of tens of thousands of cameras), the search may be optimized using accelerated hierarchical data structures (e.g. grid, octree, K-D tree) or explicit filters (e.g. only search the cameras on the X nearest buildings).

The scoring may be performed by extrapolating weighted sample points along a specific distribution shape. At its simplest, sample points may be distributed linearly on a 3D line starting from the point 115 and following the selected direction 116. Each sample point has a weight, e.g. sample points closer to the point 115 may have five times more weight than points 10 m away, to favor cameras that can see where the suspect just came from and to minimize the risk of losing sight of the suspect. In Omnipresence 3D, the default weight distribution reaches its maximum 5 m from the point 115 along the direction 116 (i.e. the expected distance reached by a pedestrian in approximately 2 seconds) and decreases quadratically from that maximum point.

Because the user input is approximate (i.e. the point he clicked may be a few pixels off, and the direction may be 10 degrees off), more complex sample point distributions are preferable. For instance, 30 lines of sample points may be distributed in a fan pattern starting from point 115 and covering 30 degrees centered at the direction 116 and distributed uniformly along the floor's plane, with weights lightly favoring the center of the fan. This approach is more forgiving to user input imprecision. It particularly helps usability in scenes with long hallways and when the user Fast Tracks far away from the camera. Because of the awkward perspective, the circular indicator and arrow appear much smaller and distorted, making it harder to aim correctly. To improve usability, a minimum size may be enforced for the circular indicator and arrow.

The point 115 typically lies on a ground floor (since it is located by intersection with the 3D model), e.g. the user clicks where the feet of the suspect were located. If the sample point distribution were on the floor as well, a cameras looking directly at the feet of the suspect would be favoured over one that look at his face, which is rarely the desired outcome. For that reason, the distribution is typically elevated by 1 to 2 m so the optimal camera is more likely to center on the hands and face instead of the feet.

When no direction 116 is specified, a circular pattern may be used, or as described later in the section on the path finding improvement, the samples may be distributed to exhaustively to explore all possible paths, until all paths are completely covered by optimal cameras or until a maximum number of optimal cameras have been identified. The best optimal camera is displayed in the Main Camera Viewport 210, and optimal cameras with lower scores are displayed in the Secondary Camera Viewports 205. This approach maximizes the probability that a suspect that goes out of sight of any camera will eventually reappear in the Main Camera Viewport 210 or one of the Secondary Camera Viewports 205.

For each candidate camera and each sample point, a visibility test is performed to confirm that the sample point can be seen without any obstructing geometry. If the sample is visible, the camera score is increased by a quality coefficient multiplied by the sample weight; otherwise it remains the same for that sample.

The quality coefficient applied on the sample weight may depend on a number of factors that qualify how well that camera sees that sample point. For instance, a camera with a higher resolution may be preferable. Instead of simply using the resolution of the camera itself, a more accurate quality factor is the physical pixel size (PPS), i.e. the physical distance between the left and right side of a pixel for that camera around the sample point. This can be estimated by projecting the sample point back on the camera to identify which pixel it fits in, then calculating the difference in angle between the left and right side, e.g. using the horizontal resolution and FOV information from the intrinsic camera calibration for a fixed or PTZ camera, or using the more complex calibration formulas typically provided by the lens manufacturer for a panoramic camera. The PPS can then be estimated using the distance from the camera to the sample point. This value can then be converted into part of the final score for that camera and sample point, e.g. by mapping it using a linear scale from the minimum acceptable resolution (e.g. pixel size is 30 cm, faces are barely visible) to a very high resolution (e.g. pixel size of 5 mm so the face is very easily recognized). Different factors can be summed together or combined using more complex calculations.

The visibility test can be performed in a number of ways. Ray casting and ray tracing are suitable for small 2D and 3D maps. For large 3D models, more efficient techniques such as depth maps may become necessary for real-time performance. This is performed by querying the candidate camera's visible depth at the candidate camera's expected screen position of the sample point. If the visible depth is smaller than the distance to the sample point or the sample point is outside the camera view frustum, then the sample point is considered not visible and no score points are awarded. When rendering a depth map or performing ray tracing and picking, large transparent surfaces (e.g. windows) should not be considered occluders. The same applies to doors that are usually opened.

Figure 4B:
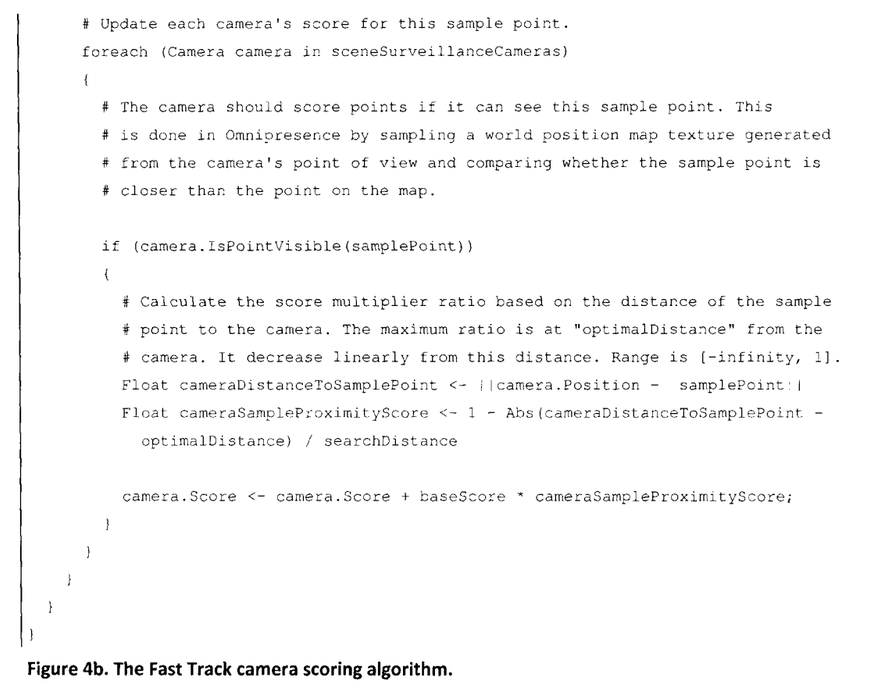

The scoring may continue until a specific number of optimal cameras have been identified or a maximum search distance (e.g. 100 m) has been reached. In this embodiment, the final score associated with each candidate camera is a real number bounded by −100000 and the number of samples and line segments used for the method. A camera will have a zero or negative score if it is already the currently selected camera or it is too far to have a good view of the selected direction. FIGS. 4A and 4B detail the pseudo-code of an exemplary implementation of the scoring method.

Many optional techniques can significantly improve the reliability of the Fast Track method. As introduced earlier, a simple path finding approach enables Fast Track to explore all possible paths leading from the point 115.

Path finding may be performed using a navigation map. The navigation map consists in a network of navigation points connected by segments where it is possible to move to and from. Typically, each room and hallway will include one or a few navigation points centered or away from the walls. For instance, indoors, the navigation map describes all possible paths someone can use to walk through the facility. Outdoors, the navigation map may consist in connected streets, tunnels and walkways.

The navigation map may be complete (i.e. covering all possible paths) or only cover the paths and corners that prove problematic with the simpler Fast Track method.

The navigation map may be integrated in the Fast Track method in multiple ways. The preferred embodiment consists in changing the sample distribution so it follows the possible paths starting near the point 115.

First, the closest navigation segment is identified either through a brute force approach (suitable for navigation maps with less than 1000 segments), or through a spatial acceleration structure. A visibility test may be performed from the point 115 to the two closest navigation point and optionally, some of the points in between. This visibility test is useful to ensure that an occluder, e.g. a wall, does not separate the navigation segment from the point 115.

The closest point on the navigation segment is then used as the starting point to extrapolate sample points for scoring purposes. The sample points are distributed following the paths, by traversing the navigation map in a breadth-first fashion. Sample points are interspersed, e.g. every 50 cm, and are weighted more the closer they are from the initial sample point so that candidate cameras are considered optimal when they minimize gaps where the suspect will not be visible.

The segments that have been traversed so far are memorized (e.g. using temporary flags on the original navigation map, or by building a temporary traversal tree). This ensures that navigation segments are never traversed twice. When a navigation map splits into multiple possible paths, each branch is explored and the weights restart at high value to favour camera(s) that can observe the intersection where the multiple branches are visible.

Samples suppression technique: Optionally, when an optimal candidate camera is identified, the scoring on the remaining candidate cameras is performed again from the initial sample point, this time suppressing (i.e. ignoring) all sample points which were visible from the optimal camera. This scoring and suppression technique can be repeated X times to identify the X+1 cameras that produce a superior coverage of most sample points (e.g. on different paths) in a complementary fashion.

Improved samples suppression: For improved results, instead of simply ignoring a suppressed sample point, it can be kept in consideration but only cameras that have an even better quality coefficient for that sample point will see their score improve, with a new quality coefficient that is the difference between the original quality coefficient and the best quality coefficient recorded for an optimal camera so far. This results in a set of optimal cameras that complement each other optimally.

In addition to hallways, the navigation map can link together different floors along staircases and escalators, the indoor and outdoor through entrances and large windows. The map viewport 230 may then be updated accordingly.

Moving objects: Navigation segments may be updated dynamically. For instance, the segment going through a door can be disabled when the door is locked. The segment going from an elevator shaft on a specific floor, to the entrance in front of the elevator, can be enabled only when the elevator is on or near that specific floor. These disable states may be ignored when the user specified a direction with a sufficiently high magnitude.

In addition to enable/disable flags on navigation segments, the navigation points themselves may move to account for moving vehicles such as trains on tracks.

A moving camera may also be taken in consideration in the transformation 110 to obtain a precise world-space point 115. Movement and dynamic events may be extracted from third-party software (e.g. control software for elevator or train station), follow a time-based schedule, or be tracked and/or estimated through GPS, RFID and visual localization methods like SLAM (http://www.robots.ox.ac.uk/~pnewman/VisualSpatial.htm).

2D: The use of a 3D map, while desirable for advanced features, is not necessary. A set of 2D maps and 2D camera placements, along with navigation segments linking different floors, may work reliably. For increased reliability, calculation may still be performed in 3D, assuming default camera and wall heights.

The calibration of every cameras (fixed, PTZ or panoramic) may be performed by measuring physically the position and location of cameras relative to the surrounding physical environment, and replicating this measurement in the 3D model. The intrinsic camera parameters (e.g. focal length based on PTZ zoom factor) may be modeled by measuring the extreme FOVs (max and min zoom factor) and performing a linear interpolation. PTZ position and orientation may be calibrated by taking the average of several calibrations looking in different directions (e.g. origin, 90 degrees along X, and 90 degrees along Y). Similarly, panoramic cameras position and orientation may be calibrated by first applying a "virtual PTZ" transformation and treating it as a real PTZ afterwards. Although this process takes time, it was shown to produce acceptable final precision in practice.

Panoramic and other non-affine lenses: Remarkably, the same approach work reliably with cameras that have unusual projection properties. For example, standard fish-eye and Panomorph panoramic lens (manufactured by ImmerVision) can be integrated as long as the visibility test is generalized over the entire hemisphere, e.g. using 5 rasterized shadow maps instead of a single one.

Optimal PTZ positioning and zooming: Optionally, the Fast Track method can control PTZs to optimize the coverage of the area of interest. Two complementary techniques follow.

Optimal PTZ control constrained to presets: A set of PTZ presets (preset position and zoom) may be assigned to each PTZ camera. Each of these presets may then be scored independently to find an optimal preset. Once one preset has been considered optimal, the other presets assigned to this camera must be ignored since the PTZ cannot point in two directions at the same time. Since PTZ cameras move at a finite speed (e.g. 1 to 3 seconds for an entire revolution) and the video is generally too blurry to be useful when they are in movement, the weights can be multiplied by a PTZ difference factor to favour small movements. The same apply to zoom.

Without loss of generality, the same technique applies to fixed cameras equipped with motorized lenses and/or installed on a separate pan-tilt head.

In order for the Fast Track user interface to work as expected, the current PTZ parameters must be known with sufficient precision (e.g. a few degrees) when initiating the Fast Track command. Newer PTZ cameras offer programmatic interfaces to query the current parameters. Older PTZ cameras can be made to work using the character reading technique described in a separate U.S. Provisional Application No. 61/315,603, entitled "Reading Characters in Low-Resolution and/or Highly Compressed Video Sequences", and incorporated herein by reference.

While the first PTZ control technique works reliably, it requires that a user or automated technique first creates a large number of presets, and it will never find the absolute optimal PTZ parameters that would have maximized the score for a given camera. The technique that follows finds a reasonable set of PTZ parameters that is close to optimum in practice.

Unconstrained optimal PTZ control: Conceptually, for a given PTZ camera, all scoring sample points are considered at once. A visibility test is performed on each sample point, as usual. All sample points that pass the visibility test are then considered to find an optimal "PTZ window", along with their weights. The PTZ window is a rectangle in angular space that will maximize the score, by including the highest-weight samples. Since a PTZ has a limited field of view (e.g. 40 degrees), not all points may be visible. It is also generally desirable to zoom on the most important part of the scene (i.e. the sample points with the highest weight), instead of simply zooming out to cover as many samples as possible.

One simple way to compute a PTZ window that is close to optimal consists in identifying the highest weight sample, then adding samples that are within search distance (e.g. 15 m). The angular bounding box of the samples that are left is then computed, and enlarged by 10% to provide context (e.g. so the hallway the person came through is visible). The aspect ratio of the bounding box is then corrected by adding padding vertically or horizontally, while keeping the original box centered. This bounding box can then be converted into pan-tilt-zoom values assuming calibrated PTZ cameras with known FOV per zoom value.

FOV adjustment for unconstrained optimal PTZ control: If the computed FOV is too wide (i.e. larger than the maximum FOV supported by the camera when it is zoomed out), a new PTZ window is generated by keeping one corner constant (e.g. top-left) and shifting the corner inwards so it fits exactly in the maximum FOV.

Similarly, if the computer FOV is too narrow (i.e. smaller than the minimum FOV supported by the camera at maximum zoom), a new PTZ window is generated by keeping one corner constant The corner that remains constant during FOV adjustment is the one that is the closest to the highest weighted sample.

The Optimal PTZ Positioning and Zooming technique works with panoramic lenses as well, with no need for FOV adjustment.

Unconstrained optimal PTZ control combined with Improved Sample Suppression: The Unconstrained optimal PTZ control method may be adjusted to account for suppressed samples by inserting the initial step of pre-multiplying the weight for each sample by the quality coefficient for this PTZ, subtracting (the best quality coefficient of a previously optimal camera*weight) and clamping to a minimum value of 0. Essentially, the samples that have the most importance are those with a high-original weight, that no optimal camera identified so far can see with high quality. During evaluation for this PTZ, the resolution-specific part of the quality coefficient can be assigned to the maximum zoom value for this PTZ. Just before selecting the optimal camera based on the candidate scores, the scores for all samples are re-evaluated, this time taking in consideration the real zoom-value selected during the FOV adjustment for the quality coefficient calculation. This ensures that cameras that can zoom very far but are actually assigned a low zoom to widen the field of view, are not favoured over cameras that can zoom less far but still obtain a superior effective resolution after FOV adjustment.

Tracking an arbitrary point: It is to be noted that the scoring method can accept a point 115 that is not limited to a ground floor or a user-specified point, by simply eliminating the sample point projection step so only the point 115 is scored against. The same technique can readily handle complementary actions such as redirecting one or multiple cameras on a user-provided point on an arbitrary point in the map (e.g. the point directly at the center of the map, so PTZs continuously follow the movement of the map), or to continually track a target provided by a third-party system such as a ground-based radar or GPS across multiple cameras.

Other features based on scoring, suppression and optimal PTZ positioning: By specifying a different distribution of weighted sample and adapting the scoring method with suppression technique and optimal PTZ positioning and zooming slightly, a whole range of useful new features become possible. Examples include the Cooperative Control of PTZ cameras to cover the 3D map and Self-Healing Perimeters.

Before explaining these features, it is to be noted that navigation techniques other than the one described thus far (Fast Track) are complementary and desirable in some circumstances.

While the Fast Track interface solves the problem of following a suspect indoor effortlessly, when following the suspect outdoor a different navigation technique is often more convenient. This technique, called the "flying navigation" in Omnipresence 3D, consists in moving freely over the map along 5 degrees of freedom: move left-right, move forward-backward, move up-down (in increments or continuously), rotate along the up-down axis, rotate along the left-right axis. The flying navigation can be performed with a mouse similarly to the navigation found in Google Earth, but the preferred way is to use a Logitech Space Navigator or other device that can readily input all 5 degrees of freedom in an intuitive and continuous manner.

In Omnipresence 3D, the flying navigation is by default always enabled and performed using the Space Navigator to navigate on the 3D map, while the Fast Track navigation is performed by left clicking on the map or in any Camera Viewport.

As noted earlier, Omnipresence 3D includes a 3D video fusion capability to display dozens of real-time or archived videos realistically on top of the 3D map. (This is sometimes referred to as 3D video draping or 3D video projection.) For each pixel in the 3D map viewport, a calculation is made to identify which fixed, panoramic or PTZ cameras has the best view of that pixel, and the 3D fusion is performed according to the precise, continuously-updated position, direction and FOV of each camera.

A simple but non-optimized approach for 3D video fusion is described here summarily. The simplest implementation consists in rendering the 3D view with a large pixel shader (e.g. using Microsoft DirectX 10) that computes, for each pixel in the 3D view, which camera has the optimal view of that pixel. The visibility is processed using shadow maps computed every time the camera direction or field of view changes. The shadow map can use the same resolution as the actual camera resolution. This naive approach is relatively easy to implement and will provide an acceptable performance as long as the number of cameras on the screen is kept low, e.g. 3 cameras at a time.

Combining the flying navigation, the 3D video fusion, and the previously explained capability to track an arbitrary point (e.g. center of the 3D map) results in an interface that allows a user to continuously follow a target such as a car in a city-wide surveillance environment, by simply moving around the map with the flying mode. But instead of having one or multiple cameras simply zoomed in on the center point, it is preferable that the cameras cover the entire screen cooperatively and synergistically, by dividing areas of the screen dynamically according to which camera sees each area the best.

Cooperative Control of Cameras for an Optimal Coverage of the 3D Map (C3DM): This feature is a variation of the previously described methods. Instead of using a distribution centered on a 3D point 115 as in Fast Track, the distribution can be generalized to consist in a weighted set of samples points distributed over one or more areas of interest, i.e. areas that should be monitored by the cameras. Increasing weights indicate relatively higher importance or priority. For instance, to enable easy tracking of suspects outdoor using available cameras by moving in a 3D viewport, the sample point distribution should cover the entire area visible from that 3D viewport. The distribution may consist in a grid pattern projected from the 3D map viewport 230, intersecting with the underlying 3D model representing the terrain and buildings. The grid may consist in cells 10 pixels wide and 10 pixels large and the weights may be uniform over the entire grid (i.e. so that camera coverage is distributed evenly over the viewport, providing a better "big picture" view) or the weight distribution may favour the center point of the viewport, with a linear decrease from 1 in the center to 0.5 in the corners (i.e. the center of the 3D map viewport 230 is typically where a suspect will be when tracking in flying navigation).

Said otherwise, the samples are points on the 3D model that appear aligned in a grid when seen from the current 3D map viewport.

To provide the maximum feel of immersion and minimize distortion of videos on the 3D model, it is preferable for the optimal cameras viewing directions to be roughly aligned with the viewing direction in the 3D map viewport 230. To this effect, during scoring, the quality coefficient may be extended to take in consideration the similitude in direction. Computing the dot product between the vectors (sample point position—virtual camera position in viewport) and (sample point position—candidate camera) results in a coefficient between 0 and 1 that can be multiplied with the previously defined coefficient.

The Improved Sample Suppression technique may then be applied X times to display X+1 cameras with complementary views of the 3D map viewport. Optimal fixed and panoramic cameras may be scored and identified first, since they do not change orientation/zoom and. PTZ cameras are evaluated afterwards so they focus on the remaining sample points for which fixed and panoramic cameras had a relatively low quality coefficient.

Self-Healing Perimeter (SHP): This feature leverages one or multiple PTZ cameras (and variations like fixed cameras on pan-tilt heads) to fill one or multiple gaps in a security perimeter. It is assumed that gap(s) in the perimeter segments have been detected (e.g. through video analytics, tamper detection in the camera, etc.), and one or multiple PTZ cameras can be freely directed to close some of these gaps. SHP may then be implemented in several steps:

1. For each perimeter segment, generate sample point distribution that covers that segment. For instance, if the perimeter segment is defined as set of lines or curves in 2D or 3D, a cylinder distribution can be generated by extruding a circle with a radius of 2 meters with 16 sample points, with one circle every 2 meters along the fence.

This time, each sample point also gets a sample normal pointing outwards from the center of the circle, so that only sample points whose sample normal faces a given camera are considered. Otherwise many distribution points would not pass the visibility test when the fence is considered opaque (e.g. wall), and it would be hard to favour cameras that can see the entire perimeter segment from one side of the fence as opposed to half of the perimeter from both sides, leaving a gap of half of the perimeter segment unmonitored.

2. The C3DM technique is applied to one perimeter segment at a time, with the following adaptations. Instead of using a grid from the 3D map viewport, one perimeter segment sample distribution is scored at a time, because it is typically preferable for the selected optimal camera(s) to have a limit FOV such that the perimeter segment is covered with maximum resolution, making it easier for a human to monitor individual segments or for video analytics to perform reliably.

For one (or multiple) camera to be considered optimal, it (they) must pass a "Facing Visibility Test" ("FVT") threshold. The FVT for a given camera is computed by dividing the number of samples on that segment that are visible by the candidate camera, by the number of samples on that segment that are facing the candidate camera, i.e. positive dot product between (sample point position—camera position) and sample normal).

An appropriate FVT threshold may differ based on the desired security redundancy and availability of spare PTZ cameras. For a facility with critical perimeter security needs and plenty of PTZ cameras (or perimeter cameras on pan-tilt heads), a good default percentage may be 75%. Facilities with less stringent security needs may lower this value, e.g. to 33% to at least achieve a good partial coverage of each gap.

Resolution test: To ensure that a minimum resolution is respected, the FVT may be combined with a per-sample, per-camera resolution test, e.g. by specifying a Minimum Physical Pixel Size ("MPPS") for each segment. For example, in a sea port application, segments on the sea could specify a MPPS of 50 cm (since the objects of interests are big, e.g. boats), while the MPPS on segments where human are expected to pass through (e.g. gate) may specify a MPPS of 1 cm to provide enough resolution to roughly recognize the person coming through.

The MPPS could also be automatically derived from the physical length of perimeter segments, e.g. by dividing the length of each segment by a typical horizontal resolution like 720 or 1024 pixels, and by dividing by a conservative factor (e.g. the FVT percentage) so a less-than-perfect camera placement may still pass.

Any optimal camera that passes both the FVT and MPPS tests is considered a good match for that segment, and other candidate cameras are considered a bad match.

Optionally, if no single candidate camera passes both tests, the process can be applied to pairs and other combinations of candidate cameras. Instead of evaluating the FVT and MPPS test on a candidate camera at a time, for each sample, the tests are considered to pass if they both pass on one of the candidate cameras. This way pairs of cameras that complement each other will result in a higher combined FVT score that may exceed the desired FVT threshold.

Once all perimeter segments have been evaluated, a list of individual or combinations of optimal cameras for each segment is known, and from this the number of good segment matches per candidate camera is easily derived. If some segments have a higher priority, they are processed first. Otherwise optimal cameras are assigned to a segment starting from the segment which has the least good matched cameras and in cases of ties, the higher FVT scores (e.g. a segment with two acceptable cameras with the best one covering 95% of samples passing both FVT and MPPS, will be processed before another with 2 acceptable cameras with a combined score of 85%). In some cases a fixed or panoramic camera may cover multiple segments with acceptable FVT and MPPS, but in most cases where the perimeter is wide and far away, PTZ cameras will only be assigned to a single perimeter segment so once assigned, it is taken out of the list and remaining assignments are sorted accordingly.

PTZ cameras that are assigned may be locked so users cannot accidentally or purposefully direct them somewhere where the gap would be re-opened. Cameras that are unassigned may be freely operated by the users. Further constraints and prioritizations may easily be implemented as well, e.g. so that PTZ cameras are excluded or favored over others.

This process results is a close-to-optimal placement of PTZ and other cameras to cover most gaps.

While illustrative and presently preferred embodiments of the invention have been described in detail hereinabove, it is to be understood that the inventive concepts may be otherwise variously embodied and employed and that the appended claims are intended to be construed to include such variations except insofar as limited by the prior art.

The invention claimed is:

1. A method for automatically selecting at least one camera among a plurality of cameras disposed in a 3D map each of the plurality of cameras comprising a field of view and a 3D position, the method comprising:
    a) for each of the plurality of cameras, calculating a 3D projective transformation of the 3D map into the field of view of the camera;
    b) determining a 3D point anywhere in the 3D map;
    c) for each of the plurality of cameras, calculating a per-camera score with respect to the 3D point, each of the per-camera scores being calculated at least with respect to an indication of the visibility of the point in the calculated 3D projective transformation of 3D map into the field of view of the camera, the calculation comprising:
        i) extrapolating a plurality of sample 3D points along an extrapolated sampling distribution 3D shape generated around the 3D point;
        ii) calculating a per-sample score for each of the sample 3D points, and combining the per-sample scores to produce the per-camera score;
    d) automatically selecting the at least one camera with the highest per-camera score; and
    e) performing an action on the selected at least one camera.

2. The method as claimed in claim 1, wherein the per-camera scores are further calculated with respect to at least one path along a network of navigation points.

3. The method as claimed in claim 1, wherein each of the per-camera scores is further calculated with respect to a potential presence of an occluder between the camera and the 3D point using the 3D map.

4. The method as claimed in claim 1, wherein the 3D point is specified by a user.

5. The method as claimed in claim 1, wherein the per-camera scores are further calculated with respect to a direction.

6. The method as claimed in claim 5, wherein the direction is specified by a user.

7. The method as claimed in claim 1, wherein the step of performing an action comprises assigning the selected at least one camera to a camera viewport.

8. The method as claimed in claim 1, wherein the step of performing an action comprises changing a direction and/or a zoom of the selected at least one camera.

9. The method of claim 1, wherein each of the per-camera scores are further being calculated with respect to a physical size of the pixels in the calculated 3D projective transformation of the 3D map into the field of view of the camera.

10. The method of claim 1, wherein the calculation of the each of the per-camera scores is triggered by dynamically modifying the 3D position of a least one of the plurality of cameras.

11. The method of claim 1, wherein the calculation of the each of the per-camera scores is triggered by dynamically modifying the determined 3D point.

12. A method for cooperative control of a plurality of cameras disposed in a 3D map, each of the plurality of cameras comprising a 3D direction, a zoom, and a 3D position in the map, the method comprising:
    a) for each of the plurality of cameras, calculating a 3D projective transformation of the 3D map into the field of view of the camera;
    b) distributing weighted sample 3D points on at least one area in the 3D map to be monitored by at least some of the plurality of cameras, wherein each of the sample 3D points is being assigned a weight relative to its importance;
    c) determining at least a subset of the plurality of cameras in which each of the cameras of the subset of the plurality of cameras is capable of viewing at least some of the sample 3D points;
    d) for each of the cameras part of the subset of the plurality of cameras, calculating a per-camera score with respect to at least some of the sample 3D points, each of the per-camera scores being calculated at least with respect to an indication of the visibility of the at least some of the sample points in the calculated 3D projective transformation of the 3D map into the field of view of the camera; and
    e) changing, if necessary, the direction and/or the zoom and/or the position of each camera of the subset of the plurality of cameras such that each camera of the subset of the plurality of cameras covers at least some of the weighted sample 3D points and such that most of the weighted sample 3D points are covered by at least one of the cameras of the subset of the plurality of cameras.

13. The method as claimed in claim 12, wherein the step of distributing the weighted sample 3D points comprises distributing the weighted sample 3D points in a pattern projected on the 3D map from a viewport.

14. The method as claimed in claim 12, wherein the step of distributing the weighted sample points comprises distributing the weighted sample 3D points along at least one geometric shape such as to approximate a security perimeter.

15. The method as claimed in claim 12, further comprising:
   a) assigning the camera with the highest per-camera score to cover a first subset of the sample 3D points;
   b) repeating step a) while ignoring already assigned cameras and already covered sample 3D points.

16. The method of claim 12, wherein each of the per-camera scores are further being calculated with respect to a physical size of the pixels in the calculated 3D projective transformation of 3D map into the field of view of the camera.

* * * * *